(12) United States Patent
Strebe

(10) Patent No.: US 8,733,735 B2
(45) Date of Patent: May 27, 2014

(54) VALVE MOUNTING ADAPTOR

(75) Inventor: Cory C. Strebe, Wauwatosa, WI (US)

(73) Assignee: Johnson Controls Technology Company, Holland, MI (US)

( * ) Notice: Subject to any disclaimer, the term of this patent is extended or adjusted under 35 U.S.C. 154(b) by 806 days.

(21) Appl. No.: 12/944,605

(22) Filed: Nov. 11, 2010

(65) Prior Publication Data

US 2012/0119131 A1    May 17, 2012

(51) Int. Cl.
*F16K 31/00* (2006.01)

(52) U.S. Cl.
USPC .......................................... 251/291; 251/293

(58) Field of Classification Search
USPC .................. 251/356, 291, 292; 137/343, 269, 137/382.5, 271
See application file for complete search history.

(56) References Cited

U.S. PATENT DOCUMENTS

| | | | |
|---|---|---|---|
| 3,720,227 A * | 3/1973 | Curran | 137/339 |
| 4,887,634 A | 12/1989 | Killian | |
| 4,921,013 A | 5/1990 | Spalink et al. | |
| 5,240,030 A * | 8/1993 | Wang | 137/269 |
| 5,564,461 A | 10/1996 | Raymond, Jr. et al. | |
| 5,975,118 A * | 11/1999 | Ulicny et al. | 137/338 |
| 6,708,720 B2 | 3/2004 | Chapman | |
| 6,880,806 B2 * | 4/2005 | Haikawa et al. | 251/292 |
| 7,048,251 B2 * | 5/2006 | Schreiner | 251/111 |
| 7,080,822 B2 | 7/2006 | Tulaskar | |
| 7,600,740 B2 * | 10/2009 | Williams, Jr. | 251/291 |
| 2006/0131532 A1 | 6/2006 | Oh | |

OTHER PUBLICATIONS

Belimo Autiomation AG—Damper Acutators for HVAC Systems, http://www.belimo.ch/CH/EN/Product/Water/index.cfm?VCat=Main, believed to be available by Nov. 1, 2010, 1 page.

* cited by examiner

*Primary Examiner* — John Bastianelli
*Assistant Examiner* — Andrew J Rost
(74) *Attorney, Agent, or Firm* — Foley & Lardner LLP

(57) ABSTRACT

A mounting adaptor for a valve actuator includes a driver aperture configured to receive a valve actuator driver. The mounting adaptor further includes a plurality of mounting posts configured to engage a thermal riser or a valve attachment pad.

10 Claims, 16 Drawing Sheets

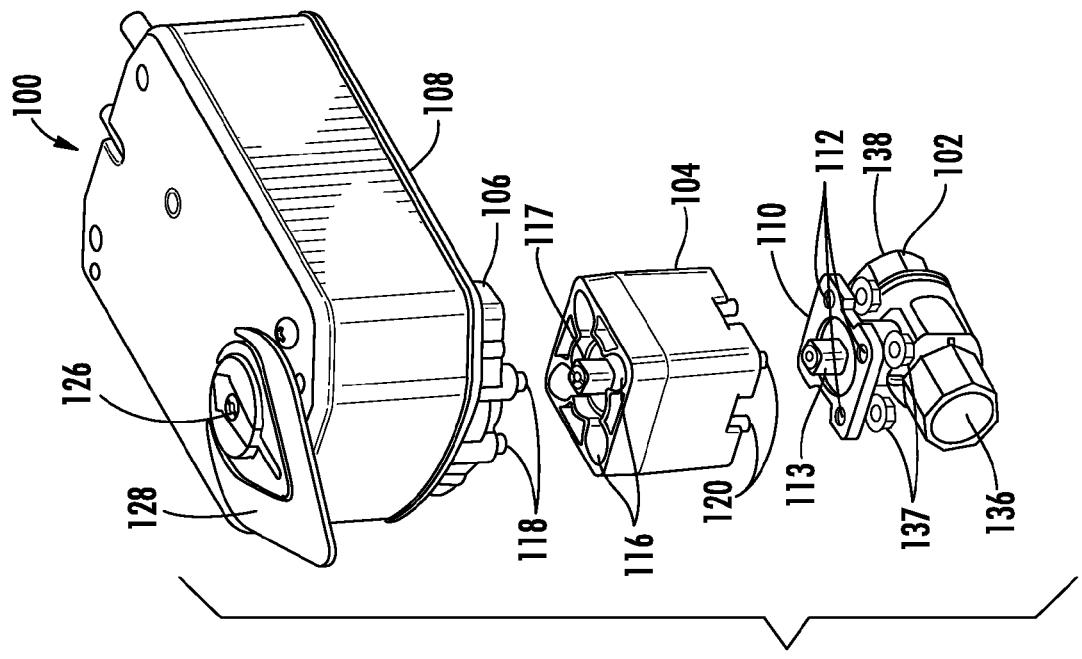
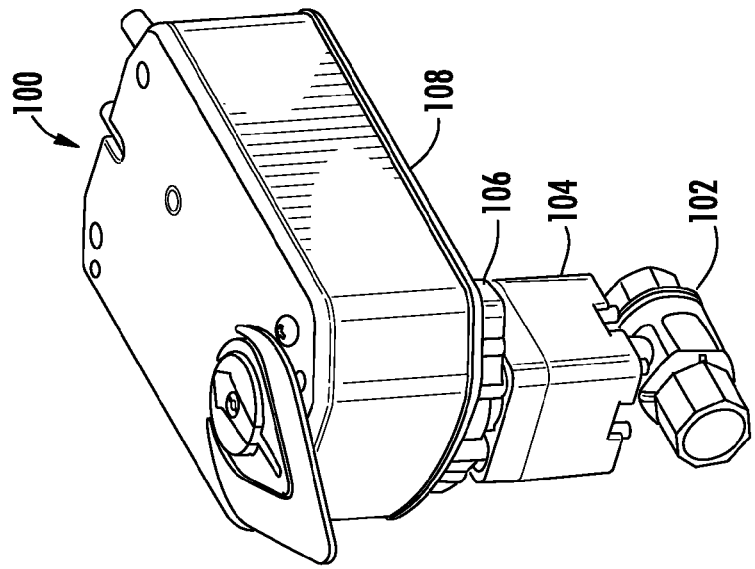
FIG. 1B
FIG. 1A

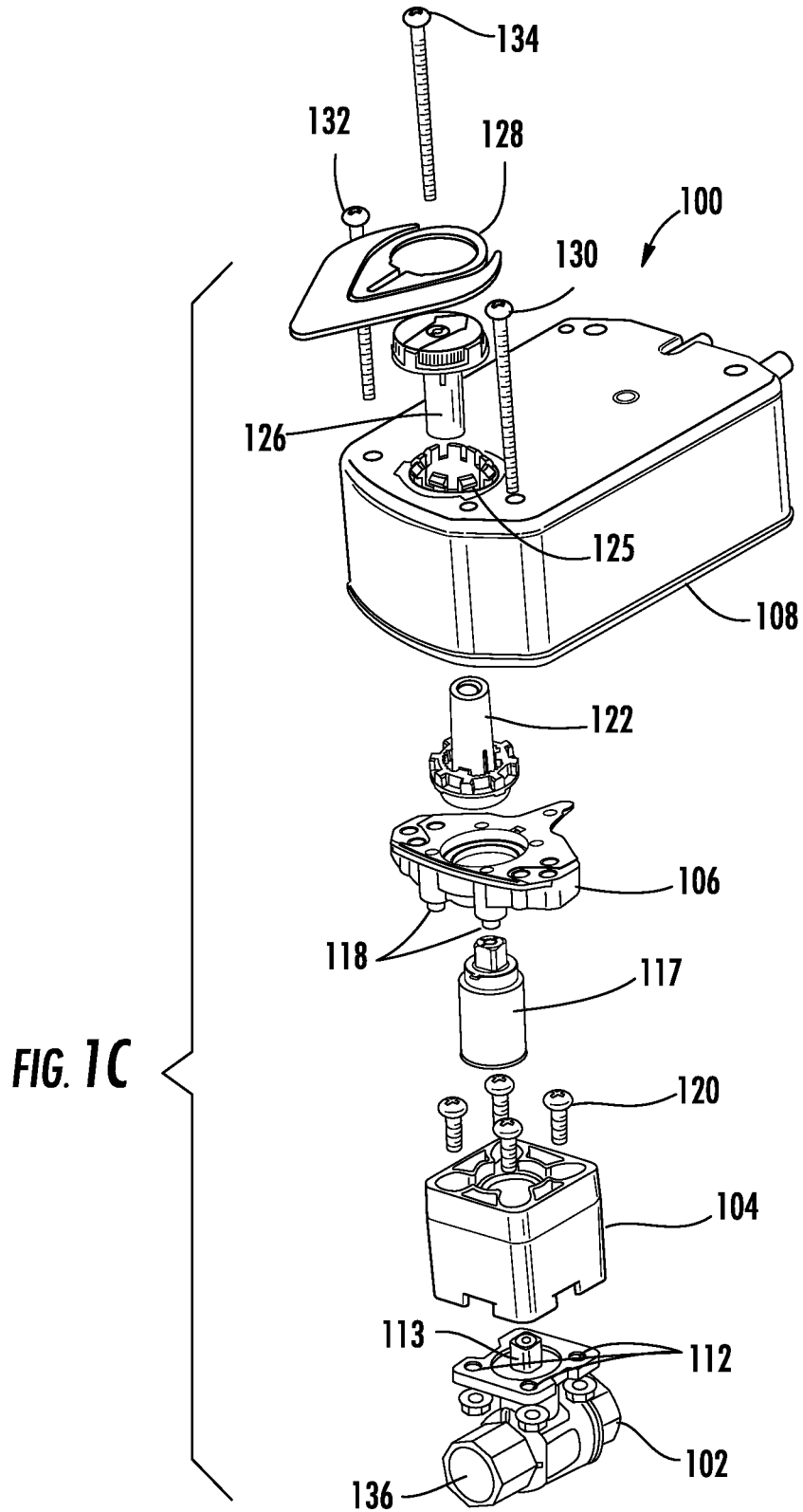

VALVE MOUNTING ADAPTOR

BACKGROUND

The present invention relates generally to the field of control valves for regulating fluids or gasses in a building. More specifically, the present invention relates to an adaptor for mounting an actuator to a valve.

Typically, a valve regulates the flow of a fluid or a gas by opening and closing a barrier within the valve that impedes the flow of the fluid or gas through the valve. The barrier may be controllably adjusted or activated by a valve actuator that is coupled to the valve.

SUMMARY

One embodiment of the invention relates to a mounting adaptor for a valve actuator. The mounting adaptor has a first surface and a second surface. The first surface is configured to contact the valve actuator. The mounting adaptor also has a driver aperture extending from the first surface to the second surface and configured to receive a valve actuator driver. The mounting adaptor further includes a plurality of mounting posts extending from the second surface that are configured to engage apertures of a thermal riser.

Another embodiment of the invention relates to a valve assembly. The valve assembly includes a valve actuator having a driver. The valve assembly also includes a drive shaft coupled to the driver. The valve assembly further includes a valve having a mounting pad and having a valve control coupled to the drive shaft. The valve assembly yet further includes a thermal riser coupled to the mounting pad of the valve; the thermal riser having a shaft aperture configured to receive the drive shaft. The valve assembly also includes a mounting adaptor coupled to the valve actuator and the thermal riser. The mounting adaptor has a driver aperture configured to receive the driver. The mounting adaptor further includes a plurality of mounting posts extending from a surface of the adaptor that are configured to engage apertures of the thermal riser.

Another embodiment of the invention relates to a valve assembly. The valve assembly includes a valve actuator having a driver. The valve assembly also includes a valve having a valve control and a mounting pad. The valve control is coupled to the driver, and the mounting pad has a plurality of apertures. The valve assembly further includes a mounting adaptor coupled to the valve actuator and to the mounting pad of the valve. The mounting adaptor has a driver aperture configured to receive the driver. The mounting adaptor also has a plurality of mounting posts that are configured to engage the plurality of apertures of the mounting pad.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 1A is a perspective view of a valve assembly, according to an exemplary embodiment;

FIGS. 1B-C are exploded perspective views of the valve assembly of FIG. 1A, according to an exemplary embodiment;

DETAILED DESCRIPTION

Figure 1D:
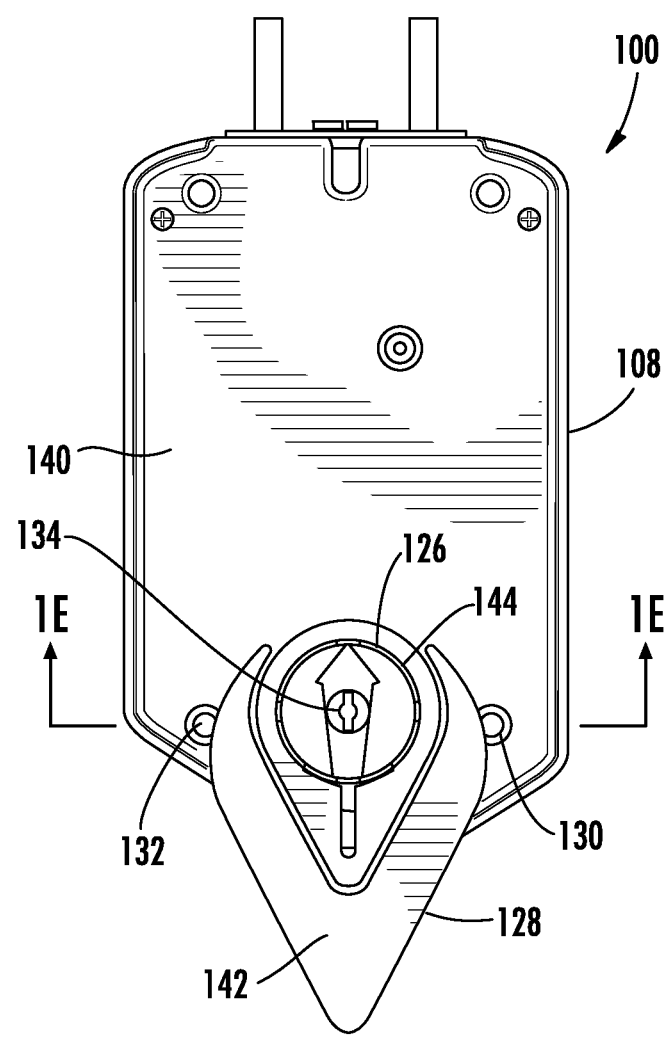
FIG. 1D is an end view of the valve assembly of FIG. 1A, according to an exemplary embodiment.

Referring generally to the figures, a valve assembly may include a valve, a thermal riser assembly, a mounting adaptor, and an actuator. The actuator controls the position of a control knob on the valve. In one position of the control knob, a fluid or gas is able to flow through the valve. As the actuator rotates the control knob, the flow of the gas or liquid is partially or fully impeded, thereby reducing or stopping the flow. Advantageously, the thermal riser assembly protects the actuator from the effects of heat when the valve regulates hot liquids or gasses. The mounting adaptor may be configured to engage the thermal riser assembly or to engage the valve directly. This allows the thermal riser assembly to be optionally used, depending on the application.

Referring now to FIG. 1A, a perspective view of valve assembly 100 is shown, according to an exemplary embodiment. Valve assembly 100 is shown to include valve 102. Valve 102 regulates the flow of a liquid or gas through it by selectively providing a barrier that impedes the flow of the liquid or gas. Valve 102 may be any number of different types of valves (e.g., a ball valve, a globe valve, etc.) configured to regulate the flow of a liquid or gas. In some embodiments, valve 102 has two modes of operation, i.e., valve 102 is either open or closed. In other embodiments, valve 102 may have any number of modes of operation that correspond to valve 102 being partially open or closed.

Valve actuator 108 controls the flow of the liquid or gas through valve 102 by operating one or more controls of valve 102. Typically, valve actuator 108 controls valve 102 using mechanical means (e.g., a motor, gears, a driver, etc.). In some embodiments, valve actuator 108 may also operate valve 102 in response to control signals received by valve actuator 108. For example, valve actuator 108 may operate valve 102 in response to signals received from a field controller or other computing device. The signals may be communicated through any number of types of communications (e.g., a wired connection, a wireless connection, etc.).

In situations where valve 102 regulates the flow of a hot liquid or gas, thermal riser 104 may be used between valve 102 and valve actuator 108. Excess heat from the liquid or gas may have a detrimental effect on the electrical or mechanical components of valve actuator 108. Advantageously, thermal riser 104 provides a spacing between valve 102 and valve actuator 108, thereby allowing heat to dissipate before reaching valve actuator 108.

Mounting adaptor 106 couples thermal riser 104 to valve actuator 108. Mounting adaptor 106 may be configured to couple with one or more different types of valve actuators, thermal risers, and valves. For example, mounting adaptor 106 may be configured to be coupled with valve actuator 108 or a different type of valve actuator. In some embodiments, mounting adaptor 106 is also configured to couple valve actuator 108 to valve 102, allowing thermal riser 104 to be selectively used. For example, if valve 102 is used to regulate a cool liquid or gas, thermal riser 104 may be omitted from valve assembly 100.

Referring now to FIG. 1B, an exploded perspective view of valve assembly 100 is shown, according to an exemplary embodiment. Valve 102 includes valve control 113 to regulate the flow of a liquid or a gas through valve 102. Valve control 113 is attached to valve 102 such that rotation of valve control 113 about its principal axis regulates the opening and closing of valve 102. For example, if valve 102 is a ball valve, valve control 113 may be coupled to a ball internal to valve 102 having a port hole extending through the ball. As valve control 113 is rotated about its principal axis, the ball is also rotated. Valve 102 is fully open, i.e., it allows the flow of a liquid or gas through valve openings 136, 138, if the port hole of the internal ball mechanism is aligned along the axis of valve openings 136, 138. Valve 102 is fully closed, i.e., it prevents the flow of a liquid or gas through valve openings 136, 138, if the port hole of the internal ball mechanism is perpendicular to the axis of valve openings 136, 138.

Valve 102 is also shown to include valve attachment pad 110. Valve attachment pad 110 includes a generally flat surface configured to engage thermal riser 104. Thermal riser 104 is secured to valve attachment pad 110 via fasteners 120 which engage mounting apertures 112 of valve attachment pad 110 and are secured to valve attachment pad 110 via nuts 137 or any other way (e.g., adhesive, welding, etc.). Thermal riser 104 provides a thermal buffer between valve 102 and valve actuator 108 and houses drive shaft 117, which operably couples valve control 113 to valve actuator 108.

Mounting adaptor 106 is shown to have mounting posts 118. Mounting posts 118 are configured to engage one or more apertures 116 of thermal riser 104 and provide added stability to valve actuator 108. In one embodiment, mounting posts 118 are also configured to engage apertures 112 of valve attachment pad 110, allowing thermal riser 104 and drive shaft 117 to be optionally used in valve assembly 100.

Valve actuator 108 also includes pointer 126, which provides visual indicia (e.g., an arrow, a line, etc.) of the position of valve control 113. Pointer 126 is operably coupled to drive shaft 117 and valve control 113 such that pointer 126 rotates with valve control 113. In some embodiments, adjustable pointer 128 is removably coupled to pointer 126 to provide additional indicia of the position of valve control 113. For example, adjustable pointer 128 may be used if the top of valve actuator 108 is obstructed from a user's view. Rotation of pointer 126 causes adjustable pointer 128 to also rotate, allowing adjustable pointer 128 to be configured in any number of positions relative to the indicia of pointer 126. For example, adjustable pointer 128 may point in a different direction than an arrow on pointer 126. In this way, a user may position adjustable pointer 128 in any number of ways to provide a visual indication of the position of valve control 113.

Referring now to FIG. 1C, an exploded perspective view of valve assembly 100 is shown, according to an exemplary embodiment. Valve actuator 108 and mounting adaptor 106 are configured to receive one or more fasteners (e.g., fastener 130, fastener 132, etc.) to couple mounting adaptor 106 to valve actuator 108. For example, fasteners 130, 132 may be threaded bolts that provide a compressive force to valve actuator 108 and mounting adaptor 106 when engaged with threaded apertures of mounting adaptor 106. In other embodiments, mounting adaptor 106 may be secured to valve actuator 108 in any number of ways (e.g., adhesive, welding, nuts, etc.).

One or more fasteners 120 secure thermal riser 104 to attachment pad 110 of valve 102. For example, fasteners 120 may be bolts that are inserted through thermal riser 104 and apertures 112 of mounting pad 110. Engaging fasteners 120 to nuts creates a compressive force that secures thermal riser 104 to valve 102. In other embodiments, thermal riser 104 may be secured to valve 102 by any number of securing means (e.g., adhesive, welding, nuts, etc.). Thermal riser 104 also houses drive shaft 117, which is operably coupled to valve control 113. Rotation of drive shaft 117 within thermal riser 104 also causes valve control 113 to rotate, thereby operating valve 102.

Pointer 126, driver 122, and drive shaft 117 are coupled by stem fastener 134. Stem fastener engages drive shaft 117 such that a compressive force secures drive shaft 117 to valve actuator 108. Valve actuator 108 operates valve 102 by rotating driver 122 about the axis formed by stem fastener 134. Rotation of driver 122 causes drive shaft 117 to rotate and, in turn, valve control 113 to also rotate, thereby controlling the flow of the liquid or gas through valve 102. Pointer 126 also rotates with driver 122 and provides a visual indication of the position of valve control 113. In other embodiments, drive shaft 117, driver 122, and pointer 126 are coupled in any number of ways (e.g., adhesive, welding, nuts, etc.).

In an alternative embodiment, thermal riser 104 and drive shaft 117 are omitted from valve assembly 100. In such a configuration, driver 122 directly engages valve control 113 and is secured to valve control 113 by stem fastener 134. In such a configuration, stem fastener 134 provides a compressive force to secure valve control 113 to valve actuator 108. Mounting posts 118 are also configured to engage apertures 112 of valve attachment pad 110 to provide additional stability for valve actuator 108 as driver 122 rotates. In some embodiments, the mounting posts 118 are configured to engage either the mounting apertures 112 of actuator attachment pad 110 or the openings of thermal riser 104, thereby allowing thermal riser 104 and drive shaft 117 to be optionally used in valve assembly 100.

Referring now to FIG. 1D, valve actuator 108 includes a generally flat surface 140. Fasteners 130, 132 contact surface 140 and provide compressive force when threaded into mounting adaptor 106 to secure mounting adaptor 106 to valve actuator 108. Pointer 126 is operably connected to driver 122 and secured to driver 122 by stem fastener 134.

Adjustable pointer 128 generally includes a flat surface 142 having aperture 144. Aperture 144 has one or more inner surfaces configured to engage outer grooves on pointer 126 to removably secure adjustable pointer 128 to pointer 126. Adjustable pointer 128 may be adjusted by applying a rotational force about the primary axis of stem fastener 134 in a clockwise or counter clockwise direction.

Figure 1E:
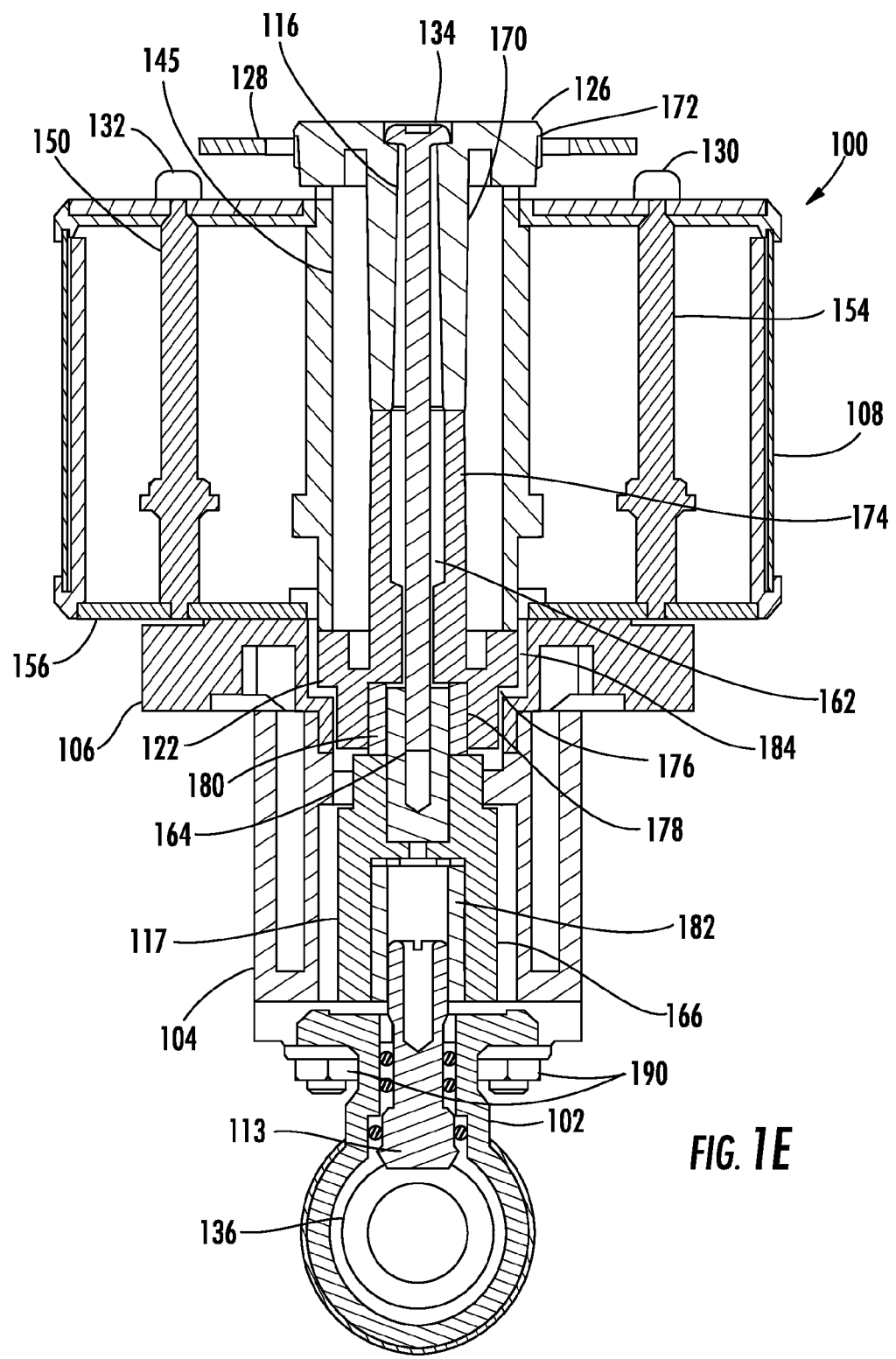
FIG. 1E is a sectional view of the valve assembly of FIG. 1A, according to an exemplary embodiment.

Referring now to FIG. 1E, valve actuator 108 is shown to have apertures 150, 152 and 154 extending through valve actuator 108 in a direction perpendicular to surface 140. Fasteners 130, 132 are configured to engage apertures 152 and 154, respectively, and supply compressive force to surface 140 when fasteners 130, 132 engage mounting adaptor 106. This force secures mounting adaptor 106 to surface 156 of valve actuator 108. For example, fasteners 130, 132 may be threadably coupled to apertures in mounting adaptor 106, shown in greater detail in FIGS. 7A-F. In another embodiment, fasteners 130, 132 penetrate through mounting adaptor 106 and are secured in any number of ways (e.g., by engaging threaded nuts, weld beads, etc.).

Pointer 126 is shown to include shaft portion 170 having a substantially cylindrical shape and configured to engage aperture 150 of valve actuator 108. Pointer 126 also includes head portion 172 having a substantially cylindrical shape with a diameter greater than the diameter of aperture 150 of valve actuator 108. Stem aperture 160 extends through pointer 126 along its primary axis and is configured to receive stem fastener 134.

Driver 122 is shown to include stem portion 174 having a substantially cylindrical shape and configured to engage aperture 150 of valve actuator 108; such valve actuator 108 can rotate driver 122 within aperture 150. Driver 122 also includes driver portion 176 having a diameter greater than the diameter of stem portion 174. Driver 122 is also shown to have stem aperture 162 configured to receive stem fastener 134. Valve actuator 108 engages grooves on driver portion 176 to rotate driver 122. Driver portion 176 also includes opening 178 extending in the same direction as stem aperture 162 and having a diameter greater than aperture 162. Opening 178 is configured to receive either valve control 113 directly or control portion 180 of drive shaft 117. Control portion 180 has the same or similar dimensions as valve control 113, allowing thermal riser 104 and drive shaft 117 to be optionally used in valve assembly 100.

Control portion 180 includes aperture 164, which extends partially into drive shaft 117. Aperture 164 is configured to receive stem fastener 134 and to secure stem fastener 134 to drive shaft 117. For example, stem fastener 134 may be threadably coupled to aperture 164 to secure stem fastener 134 to drive shaft 117. Drive shaft 117 also includes aperture 182 which is configured to receive valve control 113 such that rotation of drive shaft 117 also causes valve control 113 to rotate.

Driver aperture 184 extends through mounting adaptor 106 and has a first and second diameter. Driver aperture 184 is configured such that the first diameter is larger than the diameter of an outer edge of driver portion 176 of driver 122, thereby allowing driver aperture 184 to receive driver portion 176 of driver 122. Driver aperture 184 is also configured such that the second diameter is smaller than an outer edge of driver portion 176 of driver 122, thereby securing driver 122 to valve actuator 108 when mounting adaptor 106 is secured to valve actuator 108.

Stem fastener 134 is inserted through aperture 160 of pointer 126 and aperture 162 of driver 122 and coupled to aperture 164 of drive shaft 117 to produce a compressive force which joins pointer 126, driver 122 and drive shaft 117. A surface of head portion 172 of pointer 126 contacts valve actuator 108, thereby connecting pointer 126 to valve actuator 108 when stem fastener 134 is coupled to drive shaft 117. Valve actuator 108 controls the rotation of driver 122, thereby causing adjustable pointer 128, pointer 126, drive shaft 117, and valve control 113 to also rotate. In an alternative embodiment, drive shaft 117 and thermal riser 104 are omitted and rotation of driver 122 causes adjustable pointer 128, pointer 126 and valve control 113 to rotate.

Thermal riser 104 may optionally be used with drive shaft 117 to provide a thermal buffer between valve 102 and valve actuator 108. Drive shaft 117 is configured to engage aperture 166 of thermal riser 104 such that it can rotate when valve actuator 108 rotates driver 122. Fasteners 120 engage apertures of thermal riser 104, shown in greater detail in FIGS. 2A-D, and apertures 112 of valve attachment pad 110. In one embodiment, nuts 190 engage fasteners 120 and secure thermal riser 104 to valve 102. In another embodiment, apertures 112 are configured to engage fasteners 120 such that thermal riser 104 is secured to valve 102 without the use of nuts 190.

Figure 2A:
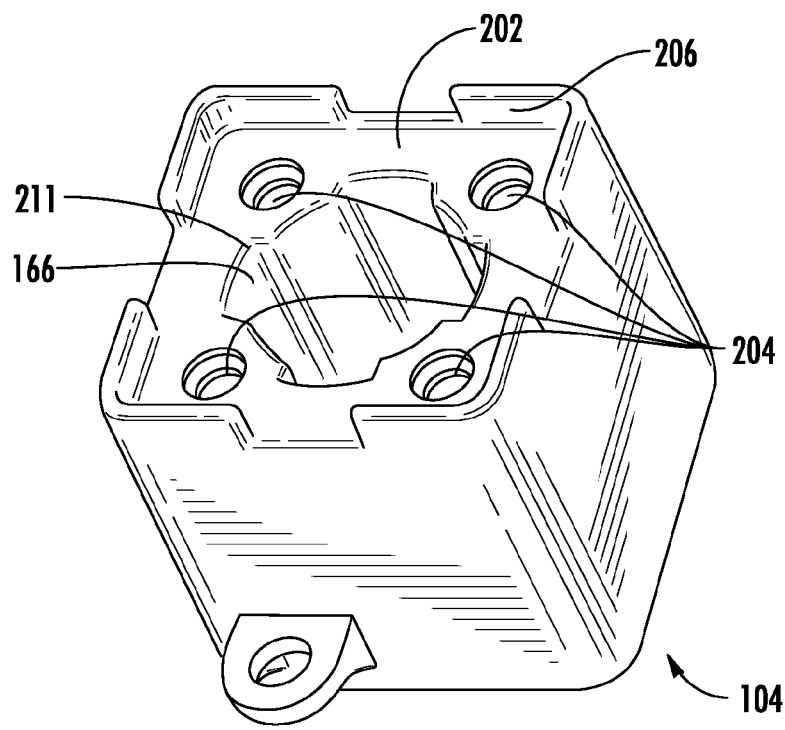
FIGS. 2A-F are detailed views of a thermal riser, according to an exemplary embodiment.
Figure 2B:
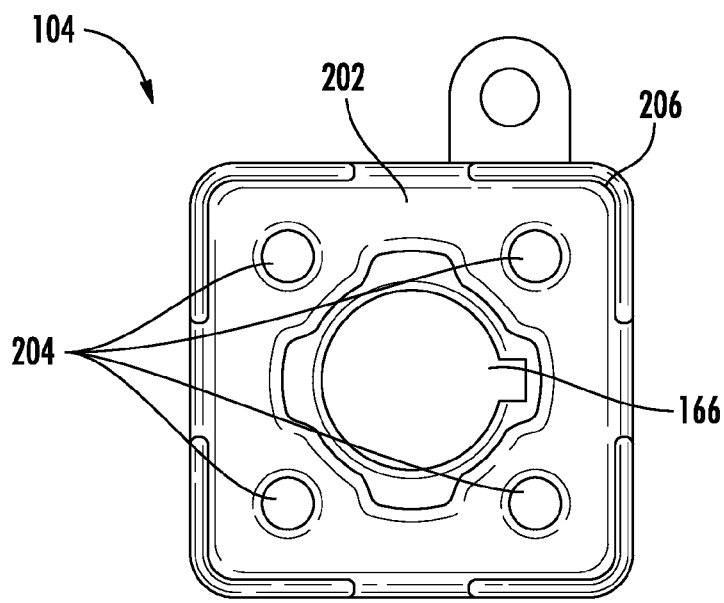
Figure 2C:
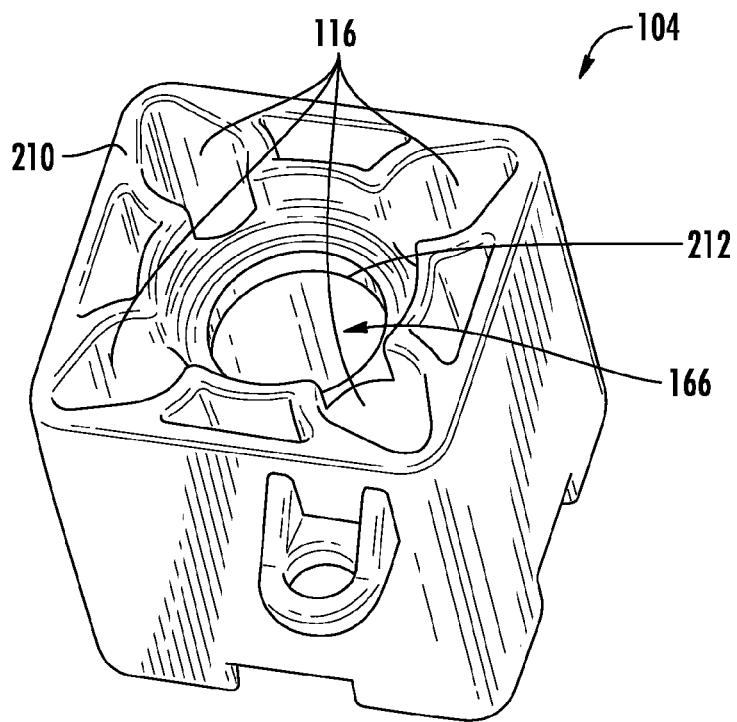
Figure 2D:
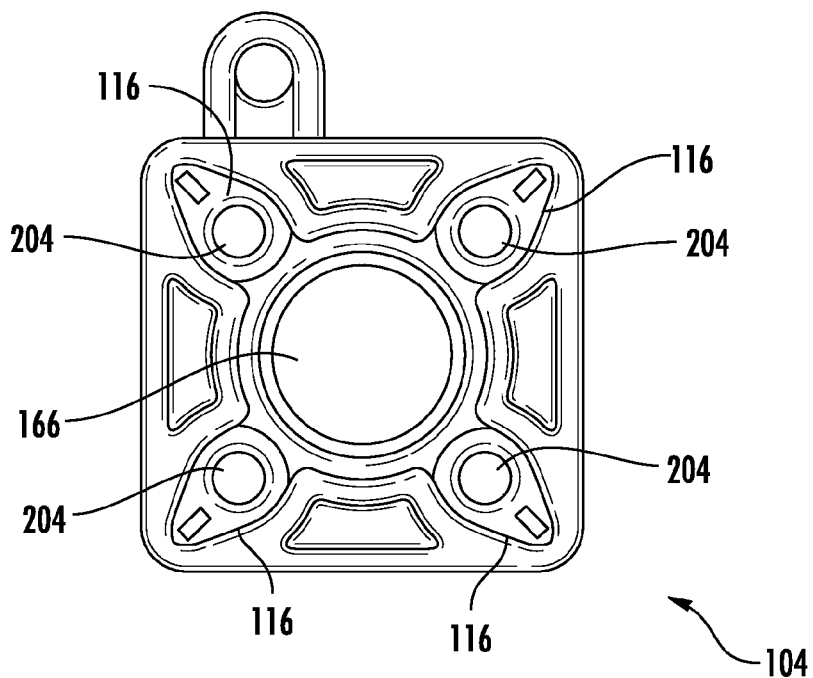
Figure 2E:
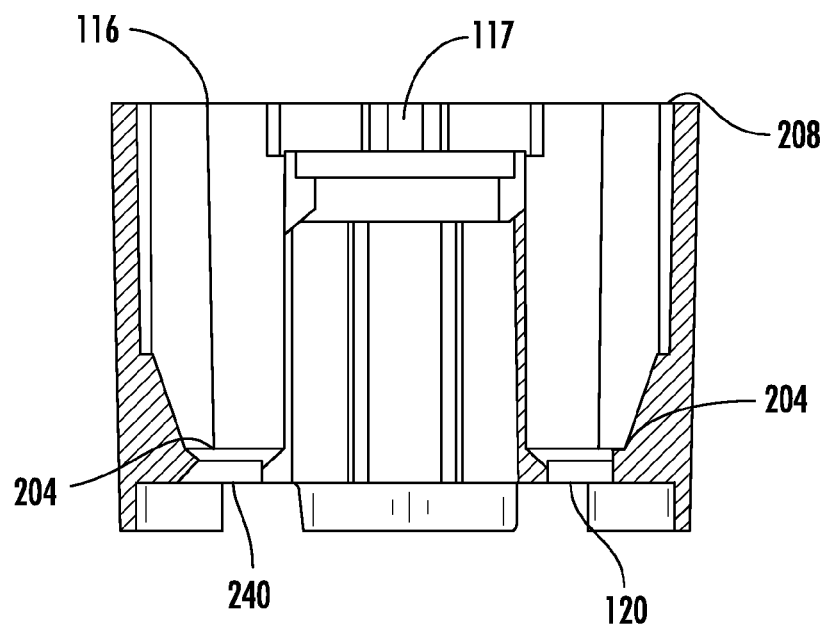
Figure 2F:
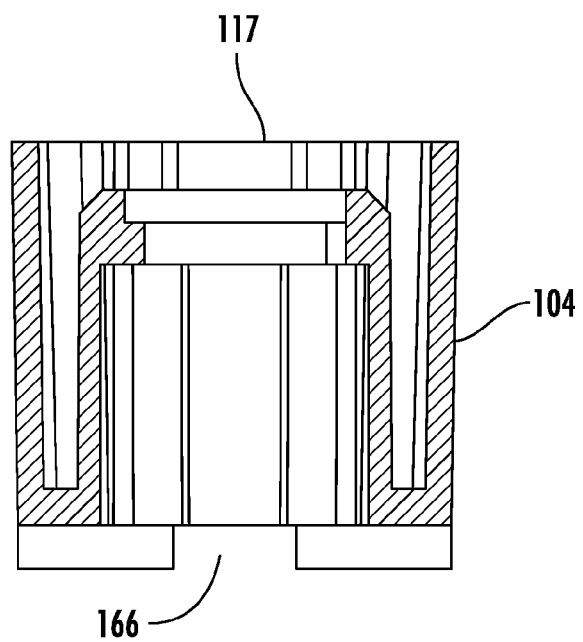

Referring now to FIGS. 2A-B, a perspective view and end view of thermal riser 104 are shown, according to an exemplary embodiment. Thermal riser 104 is shown to include surface 202. Surface 202 of thermal riser 104 contacts valve attachment pad 110 such that openings 204 of thermal riser 104 align with apertures 112 of valve attachment pad 110. Thermal riser 104 is also shown to include a plurality of ridges 206 which extend generally perpendicularly from surface 202 away from the body of thermal riser 104. Ridges 206 are configured such that one or more inner surfaces of ridges 206 contact an outer portion of valve attachment pad 110 when thermal riser 104 is attached to valve attachment pad 110. Although four ridges 206 are shown, it is contemplated that ridges 206 may be one or more ridges, in other embodiments. For example, a single ridge along the perimeter of surface 202 may also be used.

Referring now to FIGS. 2C-F, various views of thermal riser 104 are shown, according to an exemplary embodiment. Aperture 166 is shown to include a first opening 211 at surface 202 and a second opening 212 at surface 210. Openings 211, 212 are configured such that control portion 180 of drive shaft 117 may be inserted into opening 211 and engage surface 210. Opening 212 has a smaller diameter than opening 211, thereby securing drive shaft 117 to thermal riser 104, such that control portion 180 extends beyond the inner diameter of opening 212 and allows drive shaft 117 to rotate within aperture 166.

Thermal riser 104 is also shown to have apertures 116 which extend from surface 210 into thermal riser 104 and are configured to receive mounting posts 118 of mounting adaptor 106. Apertures 116 may also include openings 204 which are configured to receive fasteners 120 to secure thermal riser 104 to valve 102. In some embodiments, apertures 116 may have a non-cylindrical shape. For example, the diameters of openings 204 may be configured to receive fasteners 120 to secure thermal riser 104 to valve 102. However, the diameters of apertures 116 towards surface 210 may be larger than the diameters of openings 204 to allow apertures 116 to receive both fasteners 120 and mounting posts 118. In other embodiments, apertures 116 are generally cylindrical in shape and have a uniform diameter.

In some embodiments, thermal riser 104 may include any number of apertures 116 configured to receive mounting posts 118. For example, apertures 116 may be eight apertures configured to receive eight corresponding mounting posts 118. In other embodiments, some or all of apertures 116 are configured to receive only mounting posts 118 and not fasteners 120. For example, thermal riser 104 may include apertures configured to receive mounting posts 118 and different apertures configured to receive fasteners 120. In another embodiment, fasteners 120 are omitted and thermal riser 104 is secured to valve attachment pad 110 by other securing means (e.g., welding, adhesive, hook and loop fasteners, or any other securing means).

Any number of heat resistive materials may be used for thermal riser 104. For example, thermal riser 104 may be constructed using resin, glass-reinforced resin, rubber, etc., or any other material that reduces the transfer of thermal energy from valve 102 to valve actuator 108.

Figure 3A:
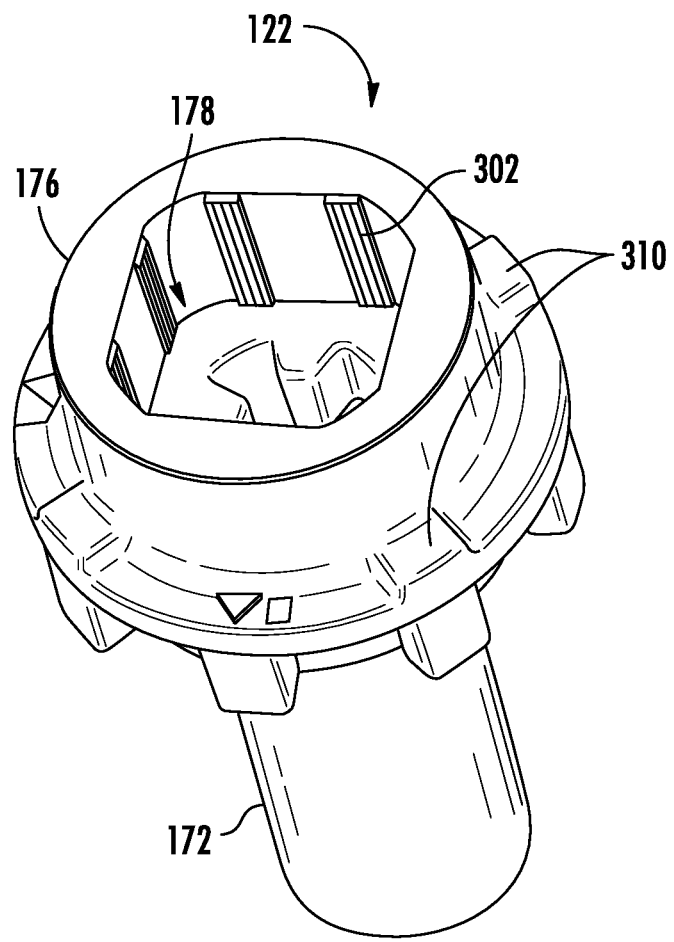
FIGS. 3A-C are detailed views of a valve actuator driver, according to an exemplary embodiment.
Figure 3B:
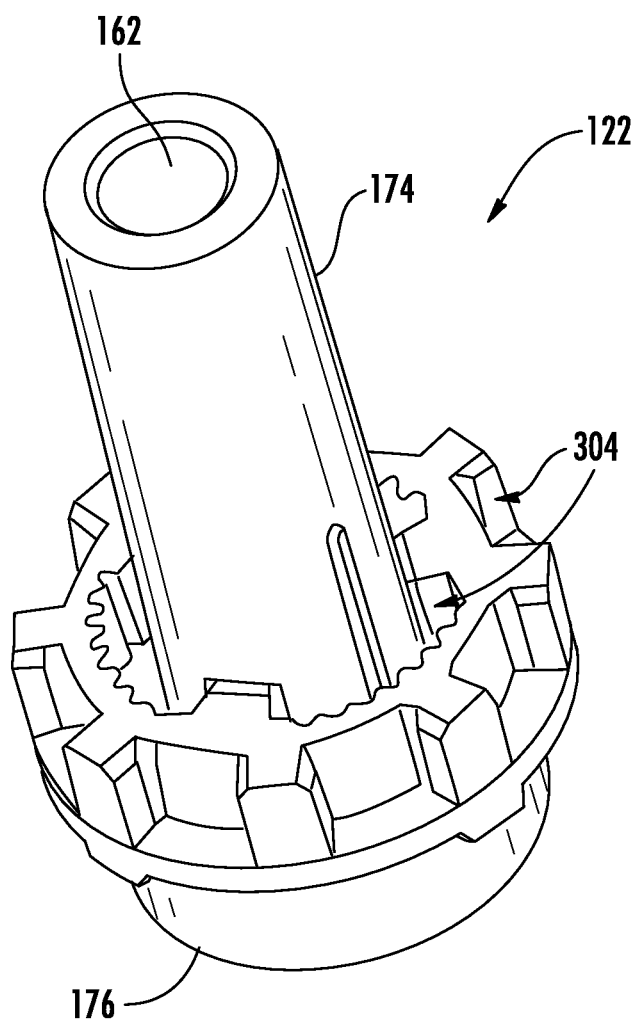
Figure 3C:
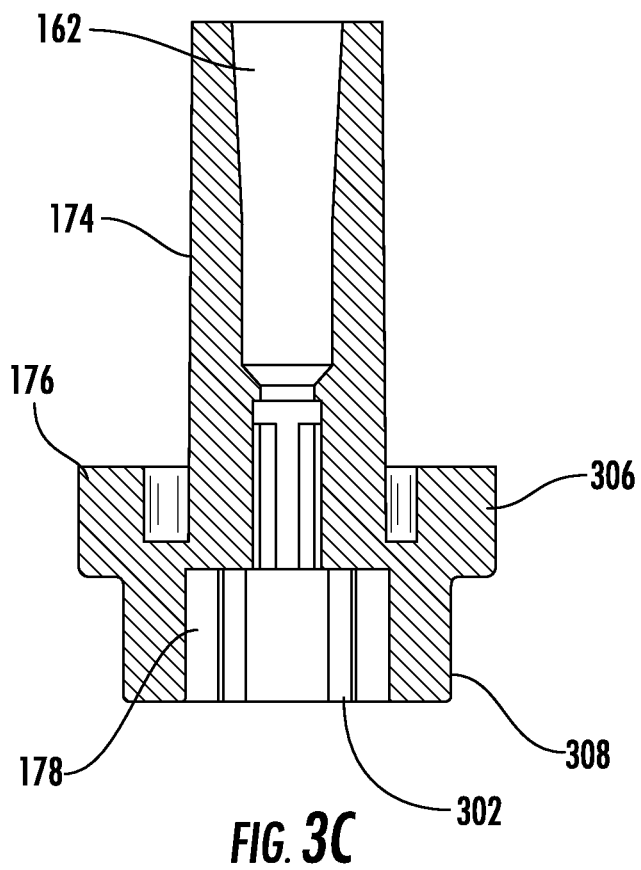

Referring now to FIGS. 3A-C, driver 122 is shown in greater detail, according to an exemplary embodiment. Driver 122 includes stem portion 174 and driver portion 176. Driver portion 176 includes opening 178 which is configured to receive valve control 113 or to receive control portion 180 of drive shaft 117. It is to be understood that opening 178 may receive valve control 113 or control portion 180 either directly or indirectly. In some embodiments, opening 178 is directly coupled to valve control 113 or control portion 180. In other embodiments, opening 178 may be operably coupled to valve control 113 or to control portion 180 by directly coupling to one or more components that are also coupled to valve control 113 or to control portion 180. An inner surface portion of opening 178 is shown to include grooves 302 which provide frictional force to rotate valve control 113 or control portion 180 of drive shaft 117 when driver 122 is rotating. Driver portion 176 is also shown to have a distal portion 308 and proximal portion 306. Distal portion 308 has a smaller diameter than proximal portion 306, thereby forming surface 310.

Stem portion 174 is configured to be inserted into aperture 150 of valve actuator 108 such that valve actuator 108 can control the rotation of driver 122 within aperture 150. Valve actuator 108 controls the rotation of driver 122 by providing force to grooves 304 of driver 122, causing driver 122 to experience a rotational force. In one embodiment, grooves 304 may be configured to engage a number of different types of valve actuators. For example, grooves 304 may include outer gearing grooves configured to engage valve actuator 108 and inner grooves to engage a different type of valve actuator.

Driver 122 is also shown to have stem aperture 162 which is configured to receive stem fastener 134. Stem fastener 134 may be inserted through aperture 162 and received by aperture 164 of control portion 180 or a similar aperture in valve control 113 to secure driver 122 to drive shaft 117 or to valve 102.

Figure 4A:
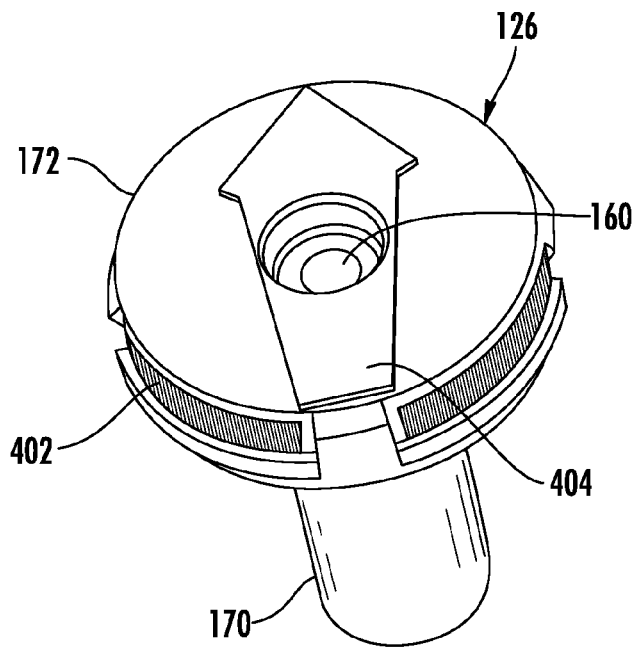
FIGS. 4A-C are detailed views of a valve actuator pointer, according to an exemplary embodiment.
Figure 4B:
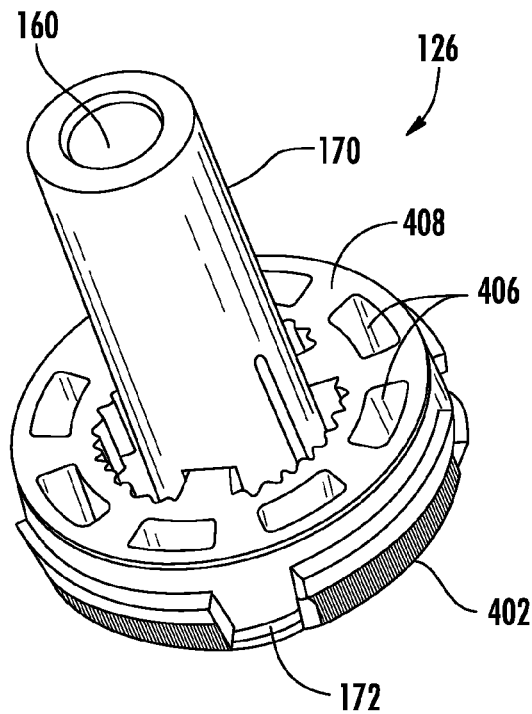
Figure 4C:
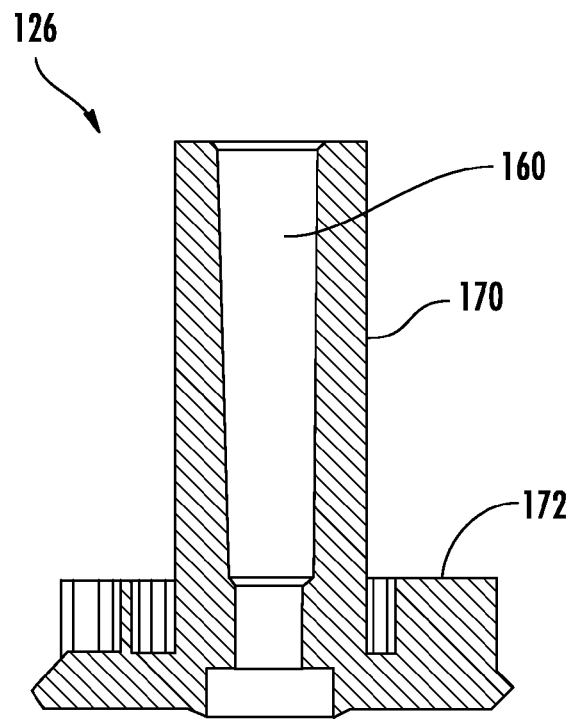

Referring now to FIGS. 4A-C, pointer 126 is shown in greater detail, according to an exemplary embodiment. Pointer 126 is shown to include shaft portion 170 having a mainly cylindrical shape and configured to engage aperture 150 of valve actuator 108. Pointer 126 also includes head portion 172 having a substantially cylindrical shape with a diameter greater than the diameter of aperture 150 of valve actuator 108. Head portion 172 may include a visual indicator 404 (e.g., an arrow, a line, etc.) that provides a visual indication of the position of valve control 113. Head portion 172 is also shown to include ridges 402 along its outer perimeter which are configured to engage adjustable pointer 128. Stem aperture 160 extends through pointer 126 along its primary axis and is configured to receive stem fastener 134. In FIG. 4B, grooves 406 are shown on a bottom surface 408 of head portion 172. Grooves 406 are configured to receive ridges 125 of valve actuator 108, as shown in FIG. 1C. As valve actuator 108 rotates driver 122, ridges 125 are also rotated, thereby causing pointer 126 to also rotate.

Figure 5:
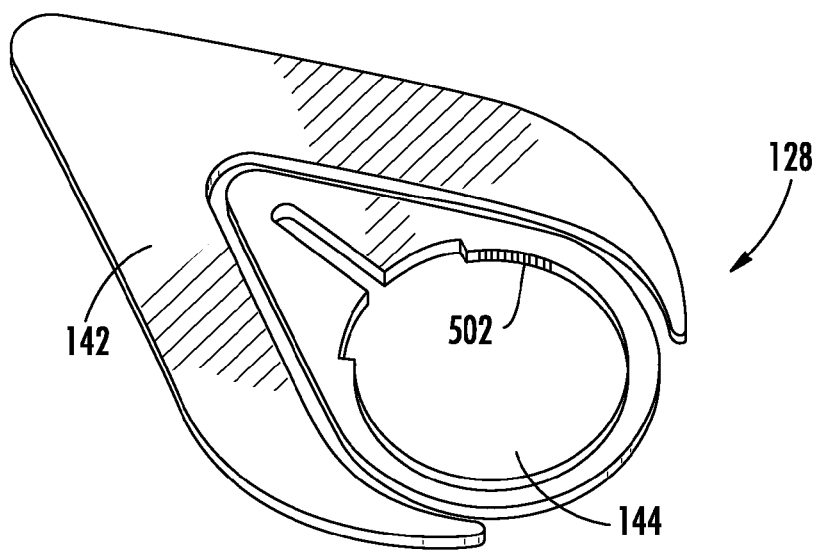
FIG. 5 is a detailed view of an adjustable pointer for a valve actuator, according to an exemplary embodiment.

Referring now to FIG. 5, adjustable pointer 128 is shown in greater detail, according to an exemplary embodiment. Adjustable pointer 128 is shown to include surface 142 and aperture 144. Surface 142 may provide a visual indication of the position of valve control 113 (e.g., have a tapered end, show an arrow, etc.). Aperture 144 is configured to receive head portion 172 of pointer 126. An inner surface of aperture 144 contains ridges 502 which are configured to removably engage ridges 402 of pointer 126. Ridges 502 provide rotational force to adjustable pointer 128, such that adjustable pointer 128 rotates with pointer 126. Adjustable pointer 128 may be rotated about pointer 126 to assume any number of different positions. In this way, the visual indication provided by surface 142 may or may not align with the visual indication provided by visual indicator 404 of pointer 126.

Figure 6A:
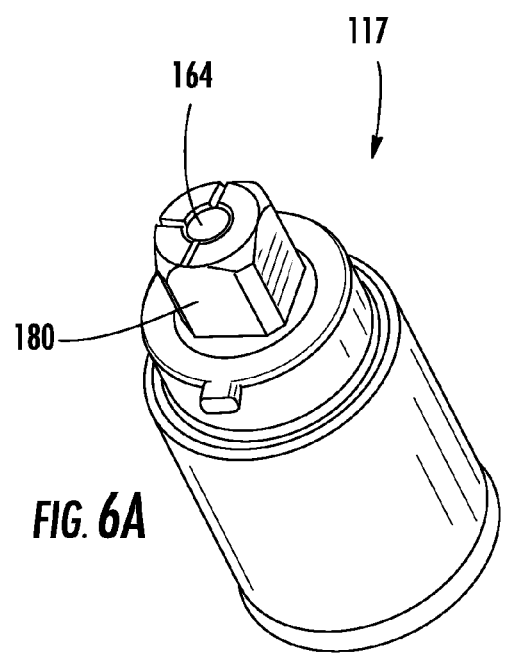
FIGS. 6A-C are detailed views of a drive shaft, according to an exemplary embodiment.
Figure 6B:
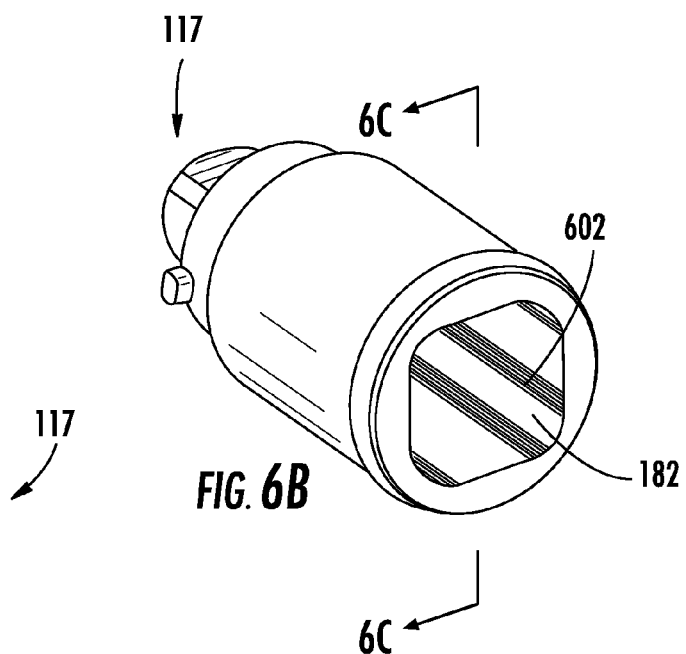
Figure 6C:
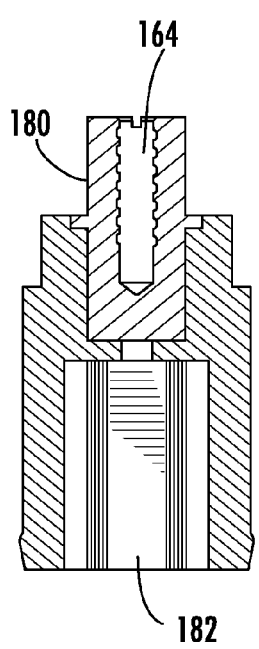

Referring now to FIGS. 6A-C, drive shaft 117 is shown in greater detail, according to an exemplary embodiment. Drive shaft 117 is shown to include control portion 180, which is configured to be received by opening 178 of driver 122. Control portion 180 includes aperture 164 which extends partially into drive shaft 117. Aperture 164 is configured to receive stem fastener 134 and to secure stem fastener 134 to drive shaft 117. Drive shaft 117 also includes aperture 182 which is configured to receive valve control 113, such that rotation of drive shaft 117 also causes valve control 113 to rotate. Aperture 182 may receive valve control 113 in any number of ways. In one embodiment, aperture 182 is configured to directly couple with valve control 113. In another embodiment, aperture 182 is configured to operably couple with valve control 113 by directly coupling with one or more other components that are coupled to valve control 113. Ridges 602 are shown on an inner portion of aperture 182 and provide frictional force to rotate valve control 113 as drive shaft 117 is rotated.

Referring now to FIGS. 7A-F, mounting adaptor 106 is shown in greater detail, according to an exemplary embodiment. Driver aperture 184 extends through mounting adaptor 106 and includes opening 702 having a first diameter and opening 704 having a second diameter. Opening 702 is configured such that its diameter is larger than that of opening 704, thereby forming inner surface 706. Opening 702 is also configured such that its diameter is larger than the diameter of proximal portion 306 of driver portion 176 of driver 122, thereby allowing driver aperture 184 to receive driver portion 176 of driver 122. Opening 704 is configured such that its diameter is larger than distal portion 308 and smaller than proximal portion 306. Driver 122 may be inserted into driver aperture 184 of mounting adaptor 106 such that surface 310 of driver 122 contacts surface 706, thereby preventing proximal portion 306 of driver 122 from passing through opening 704, but allowing distal portion 308 of driver 122 to be received by opening 704.

Any number of materials may be used to construct mounting adaptor 106. For example, mounting adaptor 106 may be made from polycarbonate resin, glass-reinforced resin, etc. or any other suitable material to couple valve actuator 108 to thermal riser 104 or to valve 102.

Mounting adaptor 106 is also shown to have a plurality of apertures 710. Apertures 710 are configured to receive a plurality of fasteners (e.g., fastener 130, fastener 132, etc.) to secure mounting adaptor 106 to valve actuator 108. Mounting adaptor 106 may include any number of apertures 710 to allow attachment to a variety of valve actuators. For example, one set of apertures may correspond to a particular type of valve actuator, while another set may correspond to a different type of valve actuator. In this way, mounting adaptor 106 may be mounted to any number of different types of valve actuators.

In some embodiments, one or more apertures 710 are threaded apertures and fasteners 130, 132, etc. are threadably coupled to apertures 710. For example, fastener 130 may be a bolt that is threaded into a threaded aperture of apertures 710. In other embodiments, apertures 710 are unthreaded and fasteners 130, 132, etc. engage other securing means (e.g., nuts, adhesive, welding, etc.) to secure mounting adaptor 106 to valve actuator 108.

Mounting adaptor 106 is further shown to include a plurality of mounting posts 118. Mounting posts 118 are configured to engage apertures 116 of thermal riser 104 or apertures 112 of valve 102. Engagement of mounting posts 118 to apertures 116 or apertures 112 provides additional stability for valve actuator 108 as it operates driver 122.

Figure 7A:
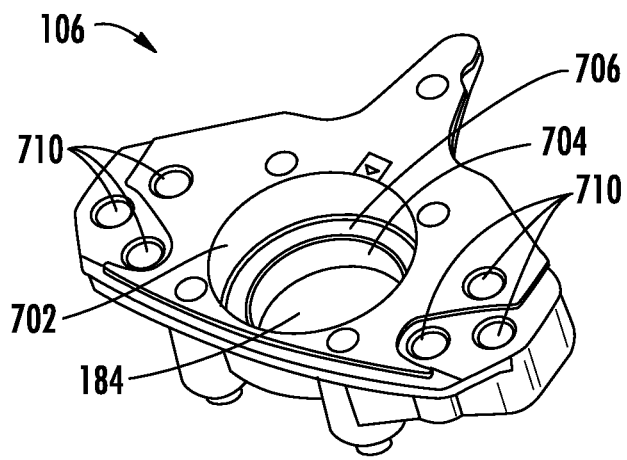
FIGS. 7A-F are detailed views of a valve mounting adaptor, according to an exemplary embodiment.
Figure 7B:
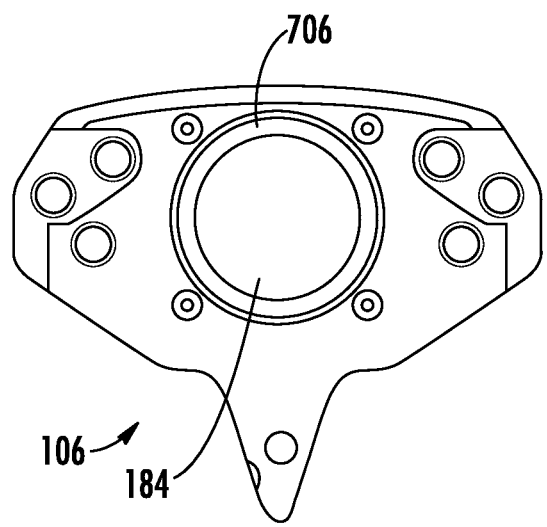
Figure 7C:
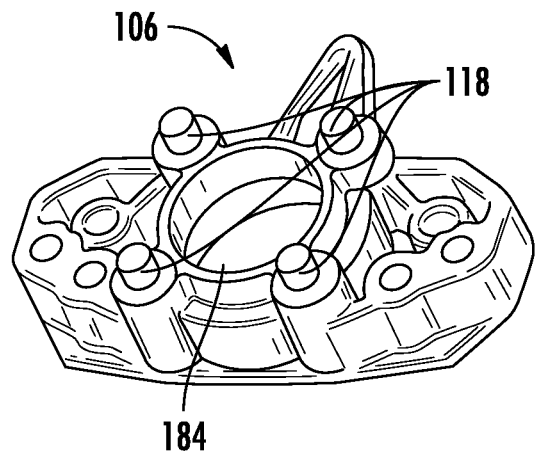
Figure 7D:
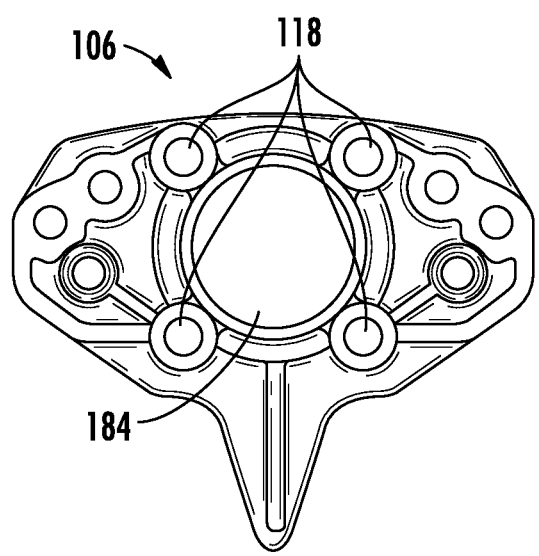
Figure 7E:
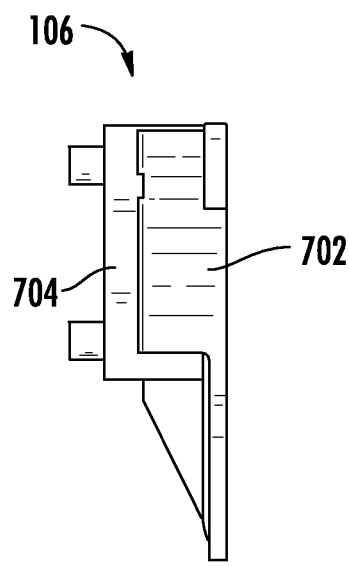
Figure 7F:
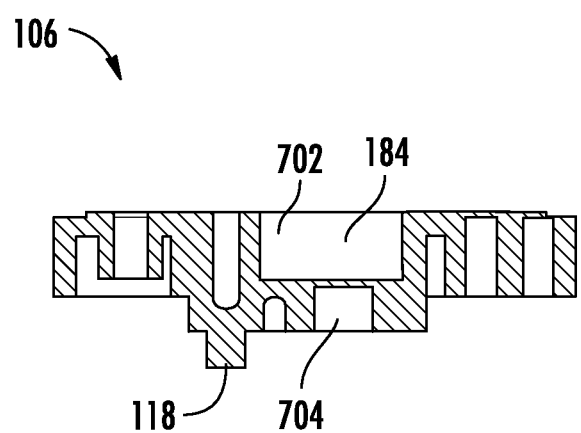

In some embodiments, mounting posts 118 may be any number of mounting posts. For example, mounting adaptor 106 may have four mounting posts, as shown in FIG. 7C. In another example, mounting adaptor 106 may have eight posts.

Mounting posts 118 may also have any number of spatial relationships between mounting posts. For example, mounting posts 118 are shown in FIG. 7C to be equidistant from the center of driver aperture 184. Each mounting post is also shown in FIG. 7C to be equidistant to two other mounting posts. However, any number of spatial relationships between mounting posts 118 are also contemplated. For example, mounting posts 118 may be two mounting posts spatially closer to the center of driver aperture 184 than a third post that is farther away from the center of driver aperture 184. In another example, mounting posts 118 may be arranged either symmetrically or asymmetrically.

According to yet other embodiments, mounting posts 118 may also have any number of shapes to engage apertures 116 or apertures 112. For example, mounting posts 118 are generally shown to be of a substantially cylindrical shape. However, any number of shapes are also contemplated. For example, mounting posts 118 may generally be rectangular in shape, hexagonal in shape, etc., or be any other shape suitable to engage apertures 116 or apertures 112 and provide stability for valve actuator 108.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Accordingly, this description is to be construed as illustrative only. The construction and arrangements, shown in the various exemplary embodiments, are illustrative only. Any of the features, elements, steps, or components of any of the exemplary embodiments discussed above may be used alone or in combination with any of the features, elements, or components of any of the other embodiments discussed above. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the invention.

What is claimed is:

1. A valve assembly comprising:
   a valve actuator having a driver;
   a drive shaft coupled to the driver;
   a valve having a valve control and a mounting pad, wherein the valve control is coupled to the drive shaft;
   a thermal riser configured to be coupled to the mounting pad of the valve, the thermal riser having a shaft aperture configured to receive the drive shaft and a plurality of apertures in a surface of the thermal riser; and
   a mounting adaptor configured to be coupled to the valve actuator and the thermal riser, the mounting adaptor having a driver aperture configured to receive the driver, wherein the mounting adaptor further comprises a plurality of mounting posts extending from a surface of the adaptor, the plurality of mounting posts configured to engage apertures of the thermal riser;
   wherein the driver comprises a first set of grooves configured to engage the valve actuator and a second set of grooves configured to engage a different valve actuator.

2. The valve assembly of claim 1, wherein there are three or more mounting posts.

3. The valve assembly of claim 2, wherein the mounting posts are located equidistant to a point within the driver aperture.

4. The valve assembly of claim 1, wherein the mounting pad includes a plurality of apertures formed therein and the posts are further configured to engage the apertures of the mounting pad.

5. The valve assembly of claim 1, wherein the thermal riser comprises a heat resistive material.

6. The valve assembly of claim 1, wherein the mounting adaptor comprises a heat resistive material.

7. A valve assembly comprising:
   a valve actuator having a driver;
   a valve having a valve control and a mounting pad, wherein the valve control is coupled to the driver, and wherein the mounting pad has a plurality of openings; and
   a mounting adaptor configured to be coupled to the valve actuator and to the mounting pad of the valve, the mounting adaptor comprising a driver aperture and a plurality of mounting posts, the plurality of mounting posts configured to engage the plurality of openings of the mounting pad;
   wherein the driver comprises a first set of grooves configured to engage the valve actuator and a second set of grooves configured to engage a different valve actuator.

8. The valve assembly of claim 7, wherein the plurality of mounting posts comprises three or more mounting posts.

9. The valve assembly of claim 8, wherein the mounting posts are further configured to engage openings of a thermal riser.

10. The valve assembly of claim 7, wherein the mounting adaptor comprises a heat resistive material.

* * * * *